United States Patent [19]

Lection et al.

[11] Patent Number: 5,801,698

[45] Date of Patent: Sep. 1, 1998

[54] DYNAMIC INFORMATION DISPLAY DURING BUSY CYCLE OF A PROCESSING SYSTEM

[75] Inventors: David Bruce Lection, Raleigh; David Allen Schell, Durham, both of N.C.

[73] Assignee: International Business Machines Corporation, Armonk, N.Y.

[21] Appl. No.: 859,808

[22] Filed: May 19, 1997

[51] Int. Cl.$^6$ ............................................. G06F 3/14

[52] U.S. Cl. .................. 345/347; 345/334; 345/145; 707/513

[58] Field of Search ..................... 345/347, 348, 345/346, 339, 145, 357; 707/513

[56] References Cited

U.S. PATENT DOCUMENTS 5,572,643  11/1996  Judson ........................... 707/531 X
5,710,897  1/1998  Schneider ........................ 345/145

*Primary Examiner*—Raymond J. Bayerl
*Assistant Examiner*—Chadwick A. Jackson
*Attorney, Agent, or Firm*—Myers Bigel Sibley & Sajovec, P.A.; Jeanine S. Ray-Yarletts

[57] ABSTRACT

Methods, systems and program products are provided which provide dynamic status to a user during the busy cycle of a processing system. The status information may be provided by displaying information to a user of a computer system during performance of an application program on the computer system by formatting the busy cursor to provide dynamic information which is unrelated to the application program in the computer system to the user during the display of the busy cursor. The dynamic information to be displayed to the user may be obtained from a source other than the application program on the computer system. The obtained dynamic information would then be used to format the busy cursor to provide the dynamic information to the user. Multiple information sources may also be utilized and the information display prioritized by a user.

27 Claims, 5 Drawing Sheets

DYNAMIC INFORMATION DISPLAY DURING BUSY CYCLE OF A PROCESSING SYSTEM

FIELD OF THE INVENTION

The present invention relates generally to user interfaces of data processors. More particularly, the present invention relates to displaying information in a user interface environment of a data processor.

BACKGROUND OF THE INVENTION

Increases in processing capability and decreases in cost of personal computers has led to the proliferation of personal computers in all aspects of society. Personal computers are utilized in schools, homes and in business. Furthermore, with the decreased cost of personal computers, it has become more feasible from a cost perspective to use computers for tasks and to carry out functions which were previously done without the use of computers.

With the proliferation of computers throughout numerous aspects of life has come a trend to graphic user interfaces which make using a computer more intuitive. Examples of such graphic user interfaces include and IBM OS/2®, Apple® Macintosh®, and Microsoft® Windows®. These operating systems all rely on a graphic user environment to facilitate use of the computer system by a user. The graphic nature of these interfaces has led to more graphic intense applications including multimedia applications, which may incorporate images, video and sound, drawing applications, and desktop publishing applications to name a few. Furthermore, even text oriented applications such as word processors have become more graphics oriented in both their user interface and in the ability to create, edit and display documents in a what-you-see-is-what-you-get (WYSIWYG) fashion.

The proliferation of graphic environments has even led to an increase in the use of graphics and multimedia in what had traditionally been a primarily text based informational forum; the Internet. Graphic user interfaces and graphic oriented web browsers (the application utilized to display information retrieved from the Internet) as well as the move to multimedia capable processing systems have allowed creators of web pages (the information retrieved from the Internet) to incorporate graphics and multimedia information into their web pages. These web pages may include animations, three-dimensional environments, sound and other information display techniques which require substantially more processing ability than a text based web page.

The move to include multimedia and graphics into applications of computer systems has not, however, come without a price. Computer systems using graphic user interfaces and capable of supporting multimedia applications typically require faster, more powerful processors to carry out the more complex functions of graphic and multimedia applications and operating systems. Furthermore, these applications and operating systems also typically require more memory accessible to the processor and more storage capabilities to handle the increased size of application programs and operating systems.

Despite advances in processing capabilities of modern computer systems, as discussed above, these advances have been accompanied by increased complexity in the applications carried out by the processing systems. These more complex applications and user interfaces may require just as much or more time to load and begin execution as their less complex, text based predecessors. Utilizing the Internet and a web browser as an example, a user of the Internet may, quite often, access a web page which requires downloading and display of a large amount of graphic data, for example, when a virtual world is accessed by a user. During this load time a processor may be unavailable for use by the user and may not accept user input (i.e. in a busy state). The processor may display an hour glass or other busy indicator such as a clock in place of the normal cursor while it is unavailable. Meanwhile, the user simply waits for the operation to finish before proceeding to the next operation. Similarly, with the increase in size of, for example, word processing programs, it may take 10 or 20 seconds for a word processor to load and be available for use by the user. During this time the user is unable to carry out any other functions and, therefore, typically just stares at the display waiting for the busy icon to go away. This busy time of the computer is essentially wasted time for the user as neither input is allowed or useful information displayed to the user other than the fact that the user is unable to proceed with the application they had started until the hour glass or other busy icon is gone.

In view of the above, it is apparent that there is a need for improvements in the utilization of time by computer systems to allow for less wasted time by a user.

OBJECTS AND SUMMARY OF THE INVENTION

In view of the above limitations of existing user interfaces, it is an object of the present invention to provide for utilizing the otherwise wasted time to provide dynamic information to a user.

Another object of the present invention is to provide information to a user other than the fact that a computer system is busy.

These and other objects of the present invention are provided by methods, systems and program products which provide dynamic status to a user during the busy cycle of a processing system. The status information may be provided by displaying information to a user of a computer system during performance of an application program on the computer system by formatting the busy cursor to provide dynamic information which is unrelated to the application program in the computer system. This information may be displayed to the user during the display of the busy cursor. The dynamic information to be displayed to the user may be obtained from a source other than the application program on the computer system. The obtained dynamic information would then be used to format the busy cursor to provide the dynamic information to the user.

In a particular embodiment of the present invention, a predefined message is selected to be displayed to the user based upon the dynamic information obtained. The busy cursor is then formatted to display the predefined message. Furthermore, the dynamic information may be a plurality of types of information. In such a case the information to be displayed may be prioritized to associate a priority with each of the plurality of types of information obtained. The type of obtained dynamic information with the highest priority may then be selected for display. User input may also be obtained to select priorities for each of the plurality of types of information obtained. A priority would then be associated with the type of information based upon the user input.

In another embodiment of the present invention a predefined set of busy cursor formats are provided. Information to be displayed to a user is then obtained from a source other than the computer program on the computer system and one of the predefined set of busy cursor formats is selected based upon the information to be displayed. The busy cursor is then formatted utilizing the selected one of the predefined set of busy cursor formats.

In still another embodiment of the present invention, the information is obtained by establishing, based upon user input, at least one information source other than the application program on the computer system. This information source is then monitored to provide information to be displayed. The predefined set of busy cursor formats may also be modified so as to incorporate into the set of predefined busy cursor formats a busy cursor format which reflects the obtained information to be displayed.

In particular embodiments of the present invention, the dynamic information is selected from the group consisting of weather information, stock quote information and daily planner information.

By displaying information during the time that a computer system is busy a user may utilize what would otherwise be wasted time. Furthermore, by utilizing the busy cursor to display the dynamic information the information may be displayed without further user information or extensive modification of application programs. Also, the user of the busy cursor typically assures that the information is visible on the display and will be noticed by the user since the user's attention is typically focused on the cursor while using an application. The display of the information would be automatic and could be prioritized so that a user may be made aware of information based on the content of the information. Accordingly, the ever increasing time which is spent waiting for an application program to exit a busy state may be put to use by the display of information to a user through the busy cursor.

As will be appreciated by those of skill in this art, the above described aspects of the present invention may be provided as methods, apparatus or computer program products.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
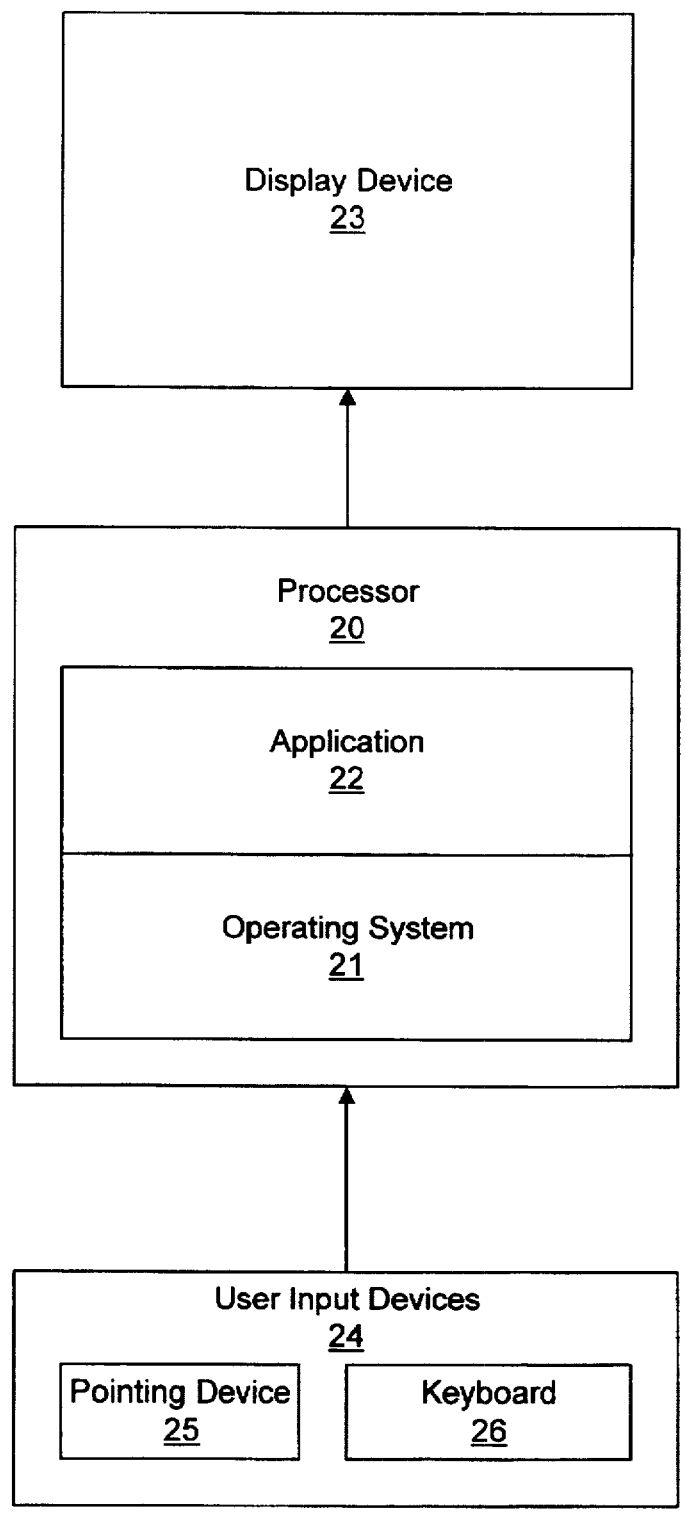
FIG. 1 is a block diagram of a system utilizing the present invention.

FIG. 1 illustrates a data processing system on which user interfaces according to the present invention may be utilized. As seen in FIG. 1, a data processor 20 may have an operating system 21 resident in the processor. An application 22 may be running on the operating system 21. The processor 20 displays information on a display device 23. The display device 23 has a plurality of picture elements (collectively referred to as a screen) which may define the appearance of a user interface environment displayed on the display device. For each picture element a color characteristics of that element includes hue, brightness, and saturation values. By manipulation of these values for each picture element of the screen the appearance or contents of the screen is established. The contents of the screen of the display device 23 and, therefore, the appearance of the user interface environment, may be controlled or altered by the application 22 or the operating system 21 either individually or in combination.

For obtaining input from a user, the operating system 21, the application 22 or both may utilize user input devices 24. User input devices 24 may include a pointing device 25 and a keyboard 26 or other input devices known to those of skill in the art. User input devices 24 may be used to designate the selection or de-selection of user selectable options associated with regions of the screen of the display device. This selection may be based upon, for example, the location of the screen indicated by a pointing device 25 or by a series of keystrokes input by the keyboard 26.

Figure 2:
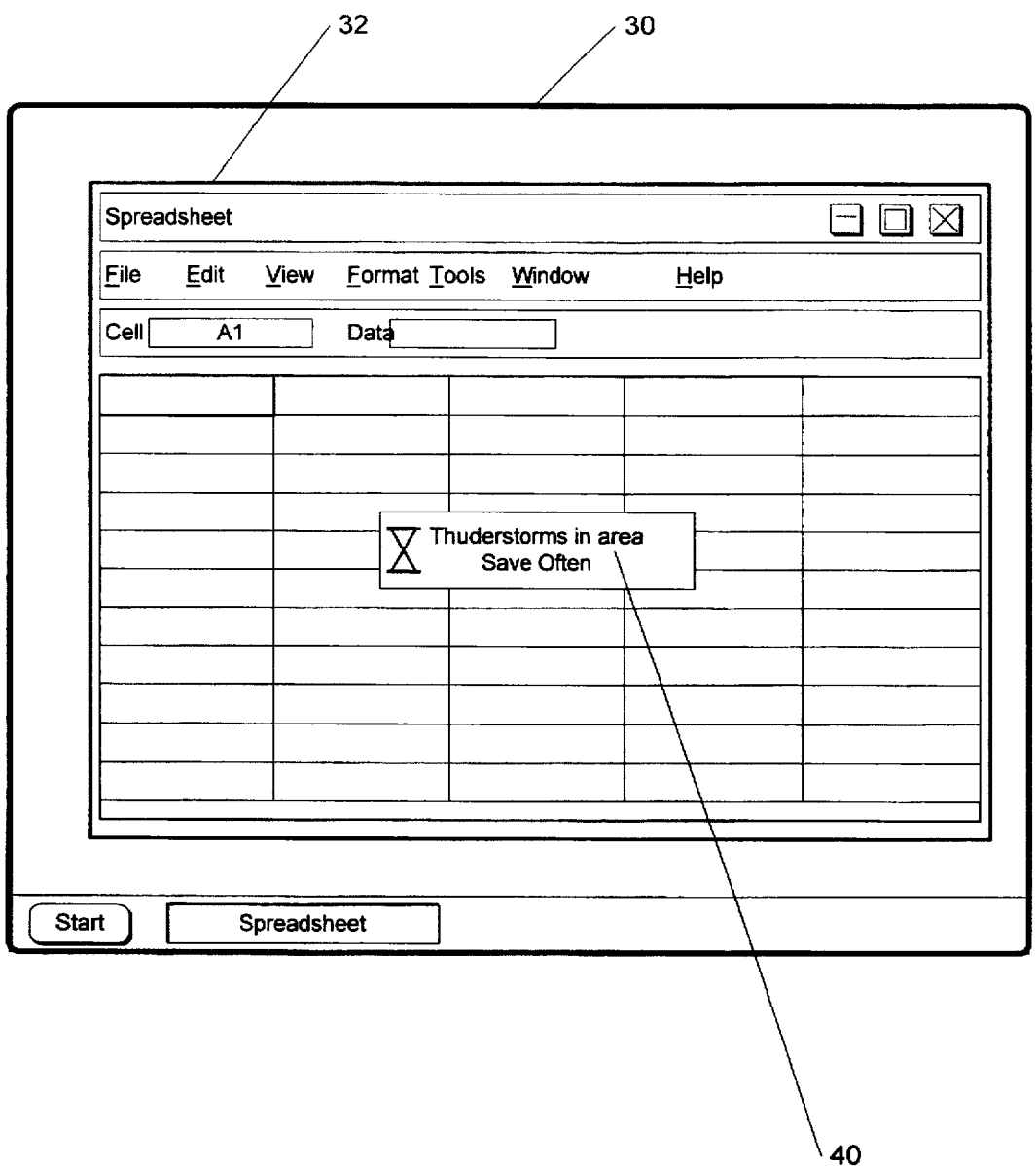
FIG. 2 is a diagram illustrating a displayed screen utilizing an embodiment of the present invention.

FIG. 2 illustrates one embodiment of the present invention. As seen in FIG. 2, a screen 30 displays a spreadsheet application 32. During a busy cycle of the spreadsheet application, for example, during a recalculation of data contained in the spreadsheet, previously a busy cursor displaying a busy icon such as an hour glass would be shown to the user on the display device 23. However, according to the present invention, rather than displaying simply the busy icon, the busy cursor is reformatted to provide dynamic information to the user which is unrelated to the application program during the display of the busy cursor. Thus, as seen in FIG. 2, the busy cursor 40 has been reformatted to provide information related to the weather. The busy cursor 40 informs the user that thunderstorms are in the area and advises the user to save their data. Thus, rather than simply waiting for the busy cycle of the computer to be complete, the user is provided with dynamic information which may be of interest to the user.

As is seen in FIG. 2, the information displayed is not related to the application which activated the busy cursor. The information displayed during the busy cycle by reformatting the busy cursor may be selected by the user and prioritized by the user. Thus, the user may select the type of information which the user would like displayed during busy cycles such as, for example, weather information, stock quote information, time or date information, or reminders which are specified by the user such as birthdays, meeting dates or other daily planner type information. As will be appreciate by those of skill in the art, any type of information which is of interest to the user may be displayed during a busy cycle by the reformatting of the busy cursor. This information may be obtained and the appropriate busy cursor format selected so that when an application displays the busy cursor the information is displayed to the user. The busy cursor format may be selected from a set of predefined busy cursor formats associated with the information to be displayed or may be generated by an application to display the information obtained.

While the present invention is described herein with respect to selection and modification of busy cursor formats in the background prior to an application entering the busy state, as will be appreciated by those of skill in the art, the busy cursor may be selected and established at various times based on the particular operating system under which the present invention is utilized. Thus, for example, the busy cursor format could be established upon activation of the busy cursor by an application program. Furthermore, the information source from which the busy cursor format obtains information could also only be accessed upon activation of the busy cursor or continuously monitored by a background program.

Where multiple types of data are of interest to a user, the user may establish a priority criteria for the data. Such a criteria could be established through, for example, a preferences dialogue box in which a user would establish the priority criteria for the display of information. The priority criteria would select from among a number of different data sources the data to be displayed based upon the user established criteria. For example, a user could create a priority criteria which selects between weather data, stock quote data, and daily reminder data based upon the content of the data. One exemplary criteria would be a hierarchical criteria that would display information based upon the immediacy of the information. Thus, for example, if threatening weather is in the area, then weather information should be displayed. If no threatening weather is in the area but a particular stock is above or below a specified value, then the stock information would be displayed. If threatening weather is not in the area and the stock is not below or above the specified threshold, then daily reminder information would be displayed. Thus, a user may have displayed to them dynamic information from a number of information sources and this dynamic information may be prioritized based upon a user specified criteria.

Figure 3:
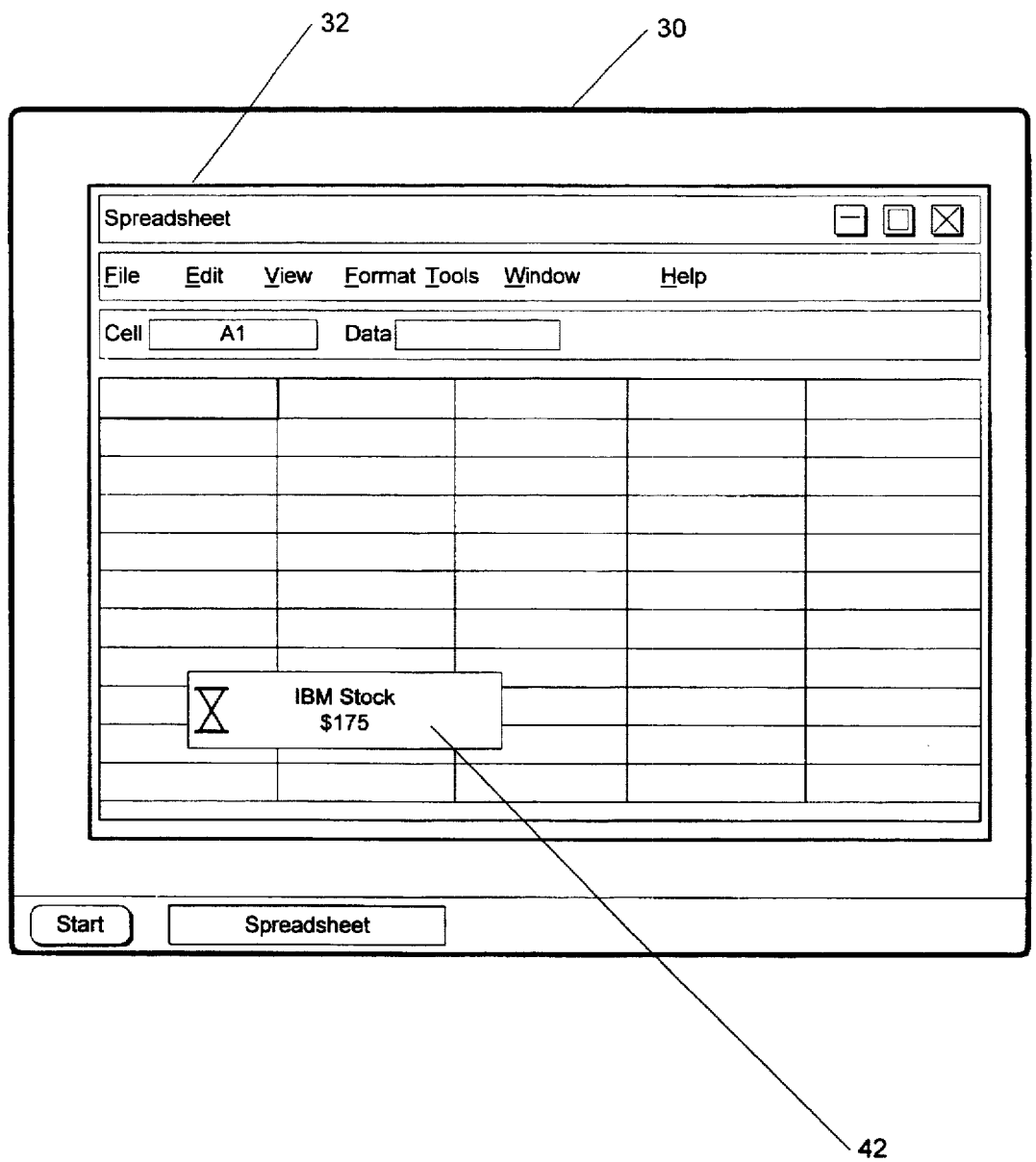
FIG. 3 is a diagram illustrating a second displayed screen utilizing an embodiment of the present invention.

This prioritizing of information to be displayed may be illustrated by comparing the display in FIG. 2 to the display in FIG. 3. FIG. 3 illustrates a second embodiment of the present invention where the source of information is a stock market quote. As seen in FIG. 3, the busy cursor 42 has been reformatted to display the price of IBM stock during a busy cycle of the computer system. The IBM stock information may be the only information of interest to the user or, as described above, the IBM stock quote could be prioritized information such that in the event that the weather information obtained is not of sufficient priority, the stock information of FIG. 3 would be displayed to the user during the busy cycle. Thus, FIG. 2 would illustrate a high priority message of threatening weather being displayed and FIG. 3 would reflect a lower priority message displayed during a subsequent busy cycle of an application program executing on the computer system which occurs after the threatening weather had passed.

One embodiment of the present invention will now be described with respect to FIGS. 4 and 5 which illustrate the operations of an application according to the present invention which reformats the busy cursor to provide dynamic information to a user during the display of the busy cursor by another application program.

Figure 4:
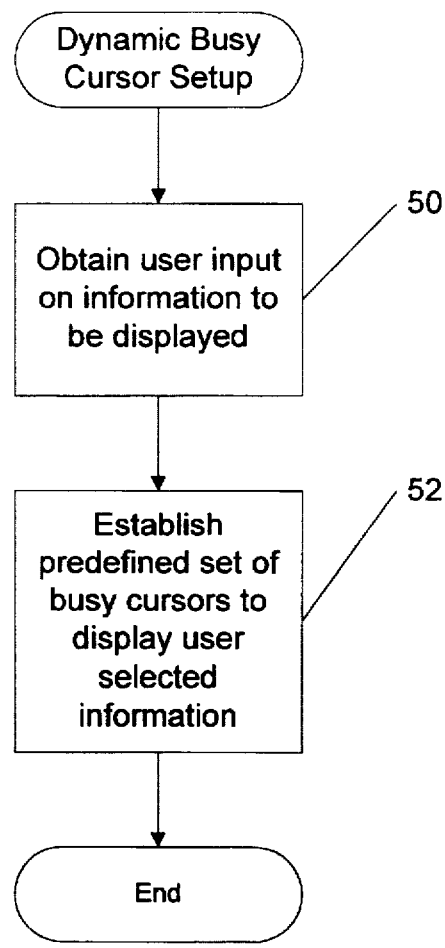
FIG. 4 is a flow chart of the process of the present invention to display information during a busy cycle of a program.
Figure 5:
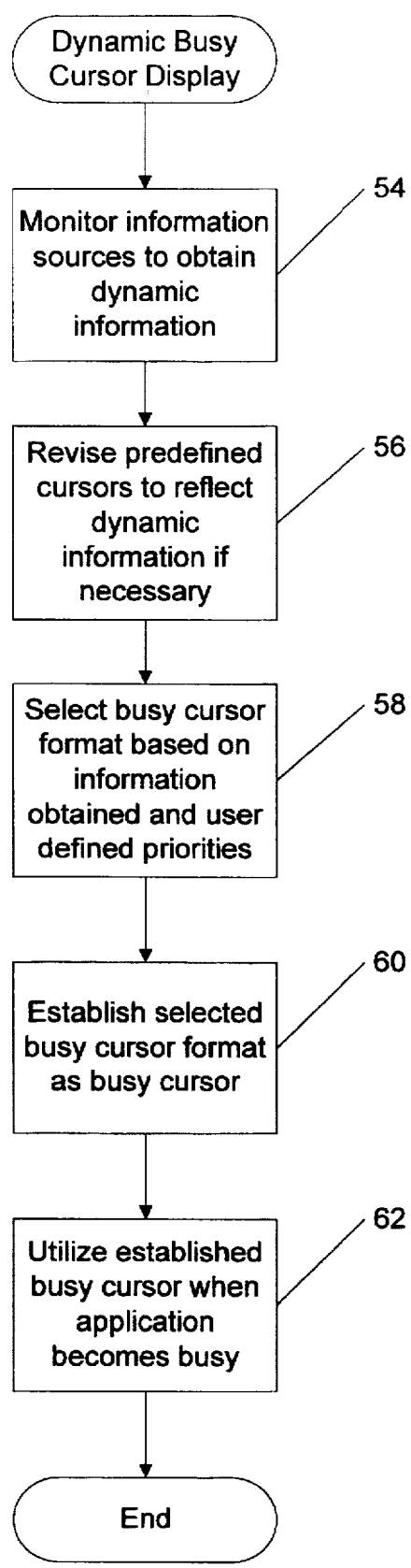
FIG. 5 is a flow chart illustrating the acquisition of information and creation of a busy cursor to represent the data according to the present invention.

FIGS. 4 and 5 are flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

FIG. 4 illustrates the operations of setting up the reformatting of the busy cursor to display dynamic information to a user during an applications busy cycle. As is seen in FIG. 4, user input may be obtained to define the information to be displayed when the busy cursor is activated (block 50). The user input may specify the source of the information to be displayed and the priority of displaying the information and may be obtained through, for example, a user preference dialogue. The priority may be hierarchical and may establish any type of criteria the user desires including content dependent criteria. Similarly, the priority could simply establish a sequence for displaying information from the different sources of data. Thus, for example, each sequential busy cycle of the computer system could display information from a different source of information. The sources of information could then be cycled through randomly, sequentially or in any pattern the user would desire.

The source of information specified by a use may be any source of information accessible to the computer system. Sources of information may include, for example, locally stored daily organizers, on-line bulletin boards, Internet web pages or other sources of information the user may select. Because more than one information source may be specified by a user, if information is not available from one information source identified by a user but is available from other sources specified by the user, then the priority of the display of information could be adjusted to compensate for the unavailability of the information source. Similarly, backup or secondary sources of information types could also be specified by a user and then utilized in the event that a primary information source was unavailable.

After establishing the sources of information a set of predefined busy cursors may be established which are utilized to replace the default busy cursor to display the dynamically obtained information (block 52). These cursors may be cursor icons in a graphic user environment such as Windows®, Windows95® or OS/2®. The cursors may include text, text and graphics or graphics only. Any number of predefined cursors may be utilized with the present invention. The cursors may remain static to reflect information from an information source. For example, a set of cursors could be generated which reflect ranges of stock prices and then the appropriate cursor selected based on the stock pricing information obtained. Alternatively, the predefined cursors may be modified based upon information from an information source so as to allow for the display of the information. As is apparent from the above description of the present invention, the term icon is used herein to refer to a graphic representation of an item. The term icon should not be construed as limited to any particular format, size, shape or appearance of a graphic representation.

FIG. 5 illustrates the operation of a system utilizing the present invention. After setup of the dynamic busy cursor specified in FIG. 4, the computer system monitors the information sources specified by the user (block 54). As the information provided by the information sources changes, the predefined cursors may be modified to reflect these changes in information (block 56) as is discussed above. A busy cursor format is then selected based on the information provided by the information sources and any priorities specified by the user (block 58). The selected busy cursor format is then established as the busy cursor format for use by an application or the operating system when the busy cursor is to be displayed (block 60). The selected busy cursor format is then utilized as the busy cursor which is displayed to a user on a subsequent occurrence of the computer busy condition (block 62).

In a Windows95® environment, the specification of a busy cursor format may be accomplished through an application programming interface (API) which allows a program to dynamically change the animated cursor used in the display of the busy and busy inhibited cursors. Thus, as will be appreciated by those of skill in the art, an application program may be readily devised which monitors an information source and then utilizes the Windows95® API to change the animated cursor to reflect the information from the information source. However, the present invention should not be construed as limited to a Windows95® system but could be utilized with any computer display system which allows for the dynamic reprogramming of the display mechanism that indicates busy.

The present invention, has been described with reference to a busy cursor. As used herein a busy cursor includes busy and busy inhibited cursors such as used in Windows95® or other indicators of the busy status of a computer system whether or not user input is inhibited.

As will be appreciated by those of skill in this art, the preceding examples are provided, not to limit or define the scope of the present invention, but to illustrate the nature of the present invention and possible uses for the teachings of the present invention. These examples may be modified in many different ways while still obtaining the benefits of the teachings of the present invention.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A method of displaying information to a user of a computer system during performance of an application program on the computer system, the method comprising the step of:

providing a predefined set of busy cursor formats;

obtaining information to be displayed to a user from a source other than the application program on the computer system;

selecting one of the predefined set of busy cursor formats based upon the information to be displayed; and formatting the busy cursor utilizing the selected one of the predefined set of busy cursor formats.

2. A method of displaying information according to claim 1, wherein said step of obtaining information comprises the step of obtaining a plurality of types of information and wherein said selecting step is preceded by the steps of:

prioritizing information to be displayed to associate a priority with each of the plurality of types of information obtained by said step of obtaining dynamic information; and selecting for display the type of obtained dynamic information with the highest priority.

3. A method of displaying information according to claim 2, further comprising the step of obtaining user input to select priorities for each of said plurality of types of information obtained by said obtaining step and wherein said prioritizing step associates a priority based upon the user input.

4. A method of displaying information according to claim 1, wherein said step of obtaining information comprises the steps of:

establishing at least one information source based upon user input; and monitoring the at least one information source to provide information to be displayed.

5. A method of displaying information according to claim 1, further comprising the step of revising the predefined set of busy cursor formats so as to incorporate into the set of predefined busy cursor formats a busy cursor format which reflects the obtained information to be displayed.

6. A method of displaying information according to claim 1, wherein the dynamic information is selected from the group consisting of weather information, stock quote information and daily planner information.

7. An apparatus for displaying information to a user of a computer system during performance of an application program on the computer system, the apparatus comprising:

a computer display for displaying information to a user, wherein a busy cursor is displayed on the computer display when the application program is in a busy state;

means for providing a predefined set of busy cursor formats:

means for obtaining information to be displayed to a user from a source other than the application program on the computer system:

means for selecting one of the predefined set of busy cursor formats based upon the information to be displayed; and means for formatting the busy cursor utilizing the selected one of the predefined set of busy cursor formats.

8. An apparatus for displaying information according to claim 7, wherein said means for obtaining information comprises means for obtaining a plurality of types of information and wherein said means for selecting comprises:

means for prioritizing information to be displayed to associate a priority with each of the plurality of types of information obtained by said means for obtaining information; and means for selecting for display the type of obtained information with the highest priority.

9. An apparatus for displaying information according to claim 8, further comprising means for obtaining user input to select priorities for each of said plurality of types of information obtained by said means for obtaining dynamic information and wherein said means for prioritizing associates a priority based upon the user input.

10. An apparatus for displaying information according to claim 7, wherein said means for obtaining information comprises:

means for establishing at least one information source based upon user input; and means for monitoring the at least one information source to provide information to be displayed.

11. An apparatus for displaying information according to claim 7, further comprising means for revising the predefined set of busy cursor formats so as to incorporate into the set of predefined busy cursor formats a busy cursor format which reflects the obtained information to be displayed.

12. An apparatus for displaying information according to claim 7, wherein the dynamic information is selected from the group consisting of weather information, stock quote information and daily planner information.

13. A computer program product for displaying information to a user of a computer system during performance of an application program on the computer system, the computer program product comprising:

a computer-readable storage medium having computer-readable program code means embodied in said medium, said computer-readable program code means comprising: computer-readable program code means for providing a predefined set of busy cursor formats;

computer-readable program code means for obtaining information to be displayed to a user from a source other than the computer program on the computer system;

computer-readable program code means for selecting one of the predefined set of busy cursor formats based upon the information to be displayed; and computer-readable program code means for formatting the busy cursor utilizing the selected one of the predefined set of busy cursor formats.

14. A computer program product for displaying information according to claim 13, wherein said computer-readable program code means for obtaining information comprises computer-readable program code means for obtaining a plurality types of information and wherein said computer-readable program code means for selecting comprises:

computer-readable program code means for prioritizing information to be displayed to associate a priority with each of the plurality of types of information obtained by said computer-readable program code means for obtaining dynamic information; and computer-readable program code means for selecting for display the type of obtained information with the highest priority.

15. A computer program product for displaying information according to claim 14, further comprising computer-readable program code means for obtaining user input to select priorities for each of said plurality of types of information obtained by said computer-readable program code means for obtaining dynamic information and wherein said computer-readable program code means for prioritizing associates a priority based upon the user input.

16. A computer program product for displaying information according to claim 13, wherein said computer-readable program code means for obtaining information comprises:

computer-readable program code means for establishing at least one information source based upon user input; and computer-readable program code means for monitoring the at least one information source to provide information to be displayed.

17. A computer program product for displaying information according to claim 13, further comprising computer-readable program code means for revising the predefined set of busy cursor formats so as to incorporate into the set of predefined busy cursor formats a busy cursor format which reflects the obtained information to be displayed.

18. A computer program product for displaying information according to claim 13, wherein the dynamic information is selected from the group consisting of weather information, stock quote information and daily planner information.

19. A method of displaying information to a user of a computer system during performance of an application program on the computer system, the method comprising:

monitoring an information source unrelated to the application program on the computer system to obtain dynamic information;

determining if information from the monitored information source is to be displayed;

providing a predefined set of busy cursor formats: and selecting one of the -redefined set of busy cursor formats based upon the information to he displayed if information from the monitored information source is to be displayed;

providing a predefined set of busy cursor formats; and selecting one of the predefined set of busy cursor formats based upon the information to be displayed if information from the monitored information source is to be displayed.

20. A method according to claim 19, further comprising:

formatting the busy cursor to display the selected one of the predefined set of busy cursor formats.

21. A method of displaying information according to claim 20, wherein said monitoring step comprises the step of monitoring a plurality of information sources, the method further comprising:

prioritizing information to be displayed to associate a priority with each of the plurality of types of information monitored by said monitoring step; and selecting for display the type of information with the highest priority.

22. An apparatus for displaying information to a user of a computer system during performance of an application program on the computer system, comprising:

means for monitoring an information source unrelated to the application program on the computer system to obtain dynamic information;

means for determining if information from the monitored information source is to be displayed;

means for providing a predefined set of busy cursor formats; and means for selecting one of the predefined set of busy cursor formats based upon the information to be displayed if information from the monitored information source is to be displayed.

23. An apparatus according to claim 22, further comprising:

means for formatting the busy cursor to display the selected one of the predefined set of busy cursor formats.

24. An apparatus for displaying information according to claim 22, wherein said means for monitoring comprises means for monitoring a plurality of information sources, the apparatus further comprising:

means for prioritizing information to be displayed to associate a priority with each of the plurality of types of information monitored by said means for monitoring; and means for selecting for display the type of information with the highest priority.

25. A computer program product for displaying information to a user of a computer system during performance of an application program on the computer system, comprising:

a computer-readable storage medium having computer-readable program code means embodied in said medium, said computer-readable program code means comprising:

computer-readable program code means for monitoring an information source unrelated to the application program on the computer system to obtain dynamic information;

computer-readable program code means for determining if information from the monitored information source is to be displayed;

computer-readable program code means for providing a predefined set of busy cursor formats;

computer-readable program code means for selecting one of the predefined set of busy cursor formats based upon the information to be displayed if information from the monitored information source is to be displayed.

26. A computer program product according to claim 25, further comprising:

computer-readable program code means for formatting the busy cursor to display the selected one of the predefined met of busy cursor formats.

27. A computer program product for displaying information according to claim 34, wherein said computer-readable program code means for monitoring comprises computer-readable program code means for monitoring a plurality of information sources, the computer program product further comprising:

computer-readable program code means for prioritizing information to be displayed to associate a priority with each of the plurality of types of information monitored by said computer-readable program code means for monitoring; and computer-readable program code means for selecting for display the type of information with the highest priority.

* * * * *